(12) United States Patent
Miller et al.

(10) Patent No.: US 11,552,485 B2
(45) Date of Patent: Jan. 10, 2023

(54) FOLD-FLAT CAR CHARGER INTERFACE

(71) Applicant: Halo2Cloud, LLC, Hartford, CT (US)

(72) Inventors: Garold C. Miller, Hartford, CT (US); Nathan Daniel Weinstein, Hartford, CT (US); Troy Starkey, Hartford, CT (US)

(73) Assignee: BOLLINGER INDUSTRIES, INC., Roanoke, TX (US)

( * ) Notice: Subject to any disclaimer, the term of this patent is extended or adjusted under 35 U.S.C. 154(b) by 194 days.

(21) Appl. No.: 16/737,077

(22) Filed: Jan. 8, 2020

(65) Prior Publication Data

US 2020/0251916 A1 Aug. 6, 2020

Related U.S. Application Data

(60) Provisional application No. 62/789,568, filed on Jan. 8, 2019.

(51) Int. Cl.
*H02J 7/00* (2006.01)

(52) U.S. Cl.
CPC .......... *H02J 7/0042* (2013.01); *H02J 7/0045* (2013.01); *H02J 7/0044* (2013.01)

(58) Field of Classification Search
CPC ....... H02J 7/0042; H02J 7/0045; H02J 7/0044
USPC .................................. 320/103, 107, 111, 114
See application file for complete search history.

(56) References Cited

U.S. PATENT DOCUMENTS

| | | |
|---|---|---|
| D330,887 S | 11/1992 | Wharton |
| D369,811 S | 5/1996 | Chen |
| 5,829,993 A | 11/1998 | Wu |
| 5,847,545 A | 12/1998 | Chen |
| 5,901,056 A | 5/1999 | Hung |
| 5,918,187 A * | 6/1999 | Weng .................. H01M 10/46 320/114 |
| 5,967,807 A * | 10/1999 | Wu ....................... H01R 29/00 439/131 |
| D456,349 S | 4/2002 | Chuang |
| 6,528,970 B1 | 3/2003 | Liu |
| 6,551,142 B2 | 4/2003 | Eisenbraun |
| D478,546 S | 8/2003 | Andre |
| 6,612,875 B1 | 9/2003 | Liao |
| 6,894,457 B2 | 5/2005 | Germagian |
| D509,792 S | 9/2005 | Hsu |

(Continued)

*Primary Examiner* — Edward Tso
*Assistant Examiner* — Aaron Piggush
(74) *Attorney, Agent, or Firm* — Lathrop GPM LLP; William T. Griffith

(57) ABSTRACT

A car charger interface, adapted for connection with a car charger socket, is connected to an electronic device or portable charger unit and movable between an extended condition for use and a retracted condition for storage. The interface has a generally flat shape when not in use and can be unfolded to a shape adapted for complementary connection with the car charger socket for use. The interface comprises a first portion and a second portion movable relative to one another between folded and unfolded conditions. The second portion may comprise wings pivotally connected along the first portion for pivoting to an unfolded position projecting from the first portion to form a generally X-shaped adapter body. Alternately, the second portion may be positioned at the longitudinal end of the first portion and connected thereto via a pivot point at the central longitudinal axis thereof for pivotal movement.

13 Claims, 12 Drawing Sheets

(56) References Cited

U.S. PATENT DOCUMENTS

| | | |
|---|---|---|
| D510,318 S | 10/2005 | Hsu |
| D543,940 S | 6/2007 | Hussaini |
| D546,287 S | 7/2007 | Tanishita |
| D554,585 S | 11/2007 | Nazar |
| D562,231 S | 2/2008 | Osieki |
| D574,833 S | 8/2008 | Hussaini |
| 7,438,574 B2 | 10/2008 | Neumann |
| D585,825 S | 2/2009 | Ji |
| D594,817 S | 6/2009 | Abdallah |
| D610,094 S | 2/2010 | Ouimette |
| D616,363 S | 5/2010 | Weng |
| D622,218 S | 8/2010 | Tseng |
| D628,152 S | 11/2010 | Fugii |
| D633,436 S | 3/2011 | Griffin |
| D636,725 S | 4/2011 | Levy |
| 7,942,691 B1 | 5/2011 | McSweyn |
| D641,695 S | 7/2011 | Wegener |
| D647,476 S | 10/2011 | Chou |
| D656,896 S | 4/2012 | Fung |
| D666,968 S | 9/2012 | Huang |
| 8,277,239 B1 | 10/2012 | Chan |
| D670,249 S | 11/2012 | Inskeep |
| D675,988 S | 2/2013 | Levy |
| D682,202 S | 5/2013 | Weaver |
| D684,930 S | 6/2013 | Wang |
| D685,326 S | 7/2013 | Kim |
| 8,491,317 B2 | 7/2013 | Vardanyan |
| D694,185 S | 11/2013 | Matsuoka |
| D701,837 S | 4/2014 | Rostami |
| D714,727 S | 10/2014 | Cai |
| 9,039,455 B2 | 5/2015 | Hsieh |
| 9,093,848 B2 | 7/2015 | Miller |
| D764,413 S | 8/2016 | McHatet |
| D778,820 S | 2/2017 | Broadhurst |
| D805,034 S | 12/2017 | Joseph |
| D816,608 S | 5/2018 | Burke |
| D820,209 S | 6/2018 | Lemelson |
| D832,212 S | 10/2018 | Hsieh |
| D842,804 S | 3/2019 | Tong |
| D845,898 S | 4/2019 | Laffon De Mazieres |
| 10,297,965 B1 | 5/2019 | Yang |
| D864,863 S | 10/2019 | Lee |
| D866,463 S | 11/2019 | Hui |
| D869,392 S | 12/2019 | Roberts |
| 2003/0037954 A1 | 2/2003 | Wu |
| 2004/0085694 A1 | 5/2004 | Germagian |
| 2005/0009404 A1 | 1/2005 | Lee |
| 2006/0267549 A1* | 11/2006 | Kung .................. H02J 5/00 320/111 |
| 2006/0273760 A1* | 12/2006 | Yang .................. H02J 7/0042 320/112 |
| 2007/0126290 A1 | 6/2007 | Jaynes |
| 2007/0202724 A1* | 8/2007 | Neumann .......... H01R 13/6675 439/172 |
| 2007/0247105 A1 | 10/2007 | Krieger |
| 2007/0273325 A1 | 11/2007 | Krieger |
| 2008/0284371 A1 | 11/2008 | Hsu |
| 2009/0167241 A1 | 7/2009 | Lee |
| 2009/0267562 A1 | 10/2009 | Guccione |
| 2010/0202137 A1 | 8/2010 | Dalton |
| 2010/0231165 A1 | 9/2010 | Griffin |
| 2011/0254500 A1* | 10/2011 | Lee .................. H01R 24/38 320/107 |
| 2012/0166697 A1 | 6/2012 | Hu |
| 2012/0238132 A1 | 9/2012 | McSweyn |
| 2013/0183852 A1 | 7/2013 | Rostami |
| 2013/0328526 A1* | 12/2013 | Levy .................. H01R 31/065 320/109 |
| 2014/0152257 A1* | 6/2014 | Miller ................ H02J 7/0042 320/111 |
| 2014/0333263 A1 | 11/2014 | Stewart |
| 2015/0028797 A1* | 1/2015 | Miller ................ H02J 7/342 320/103 |
| 2015/0280479 A1 | 10/2015 | Levy |

* cited by examiner

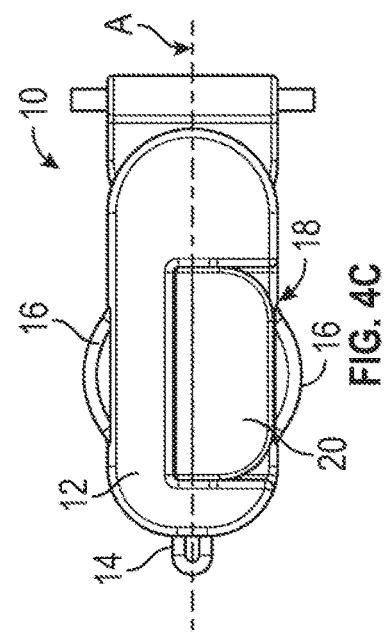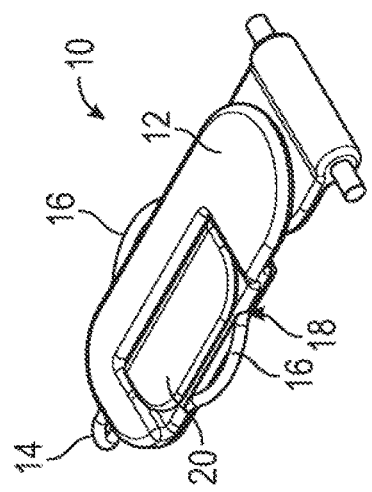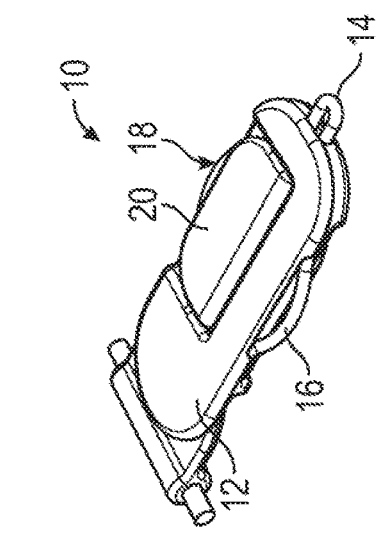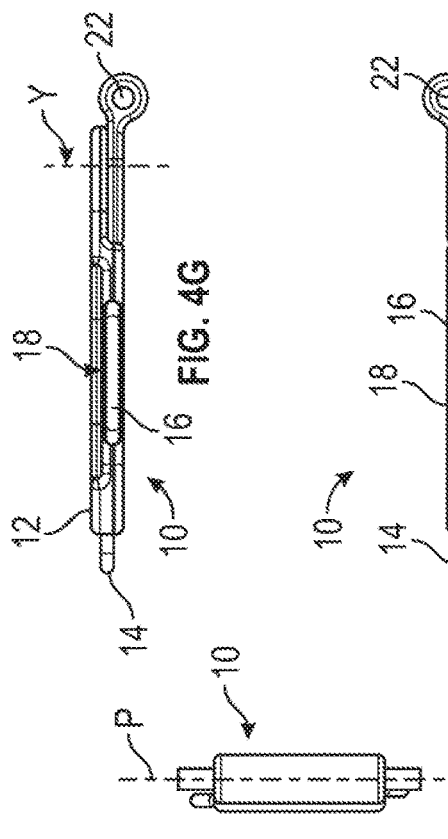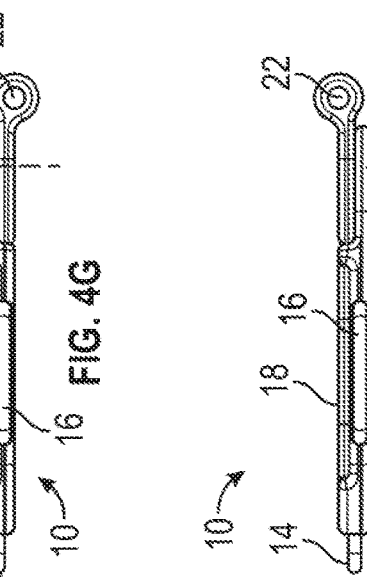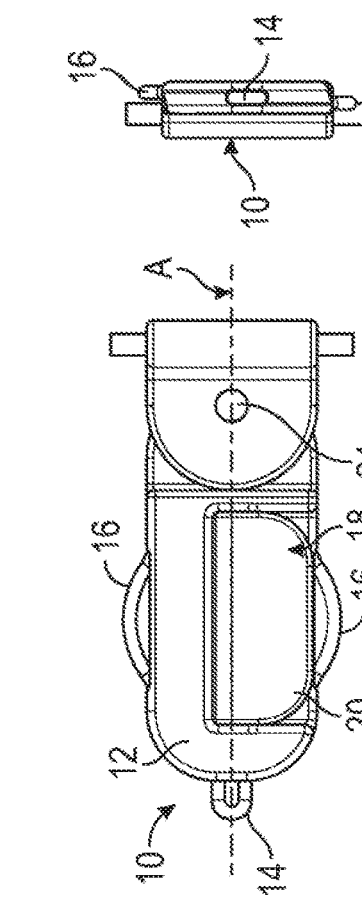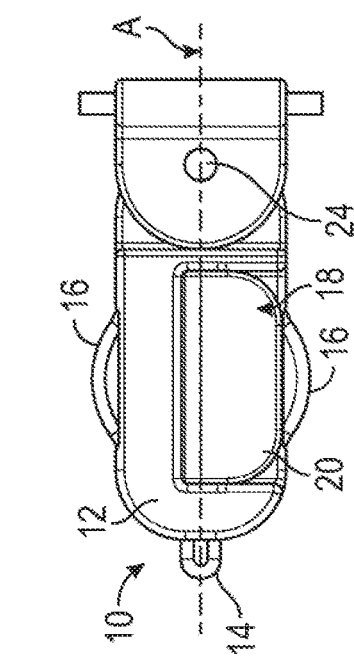

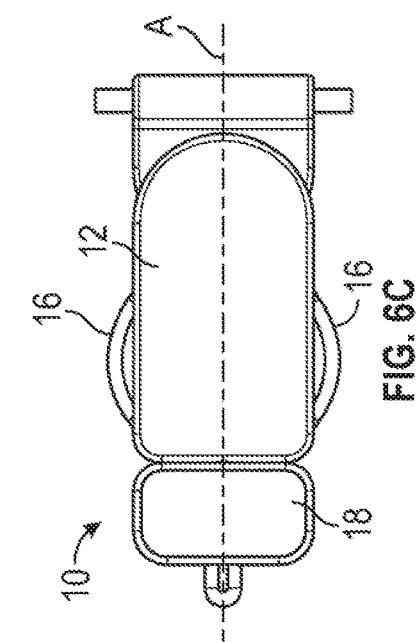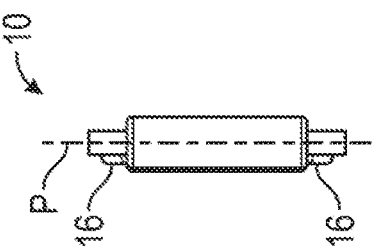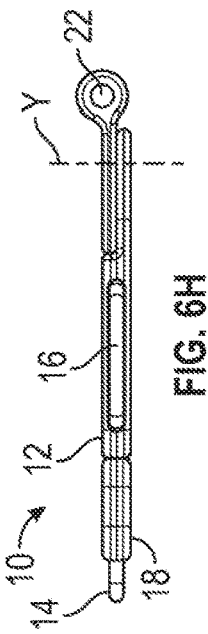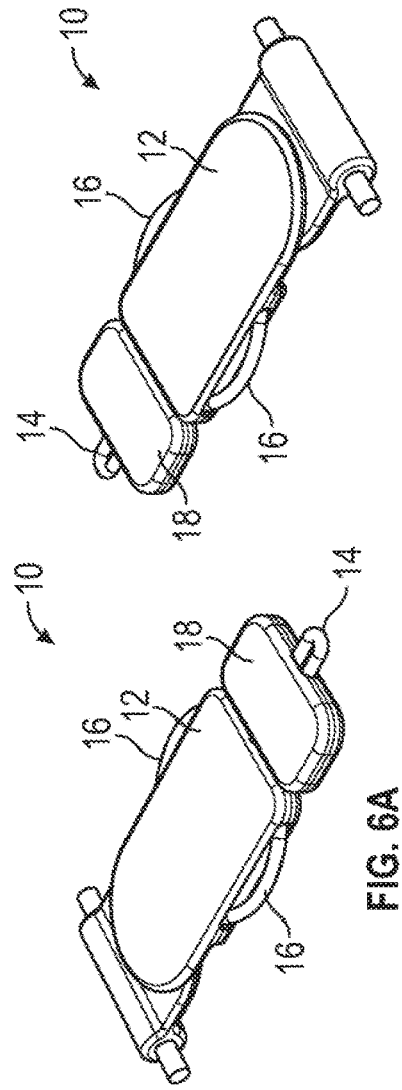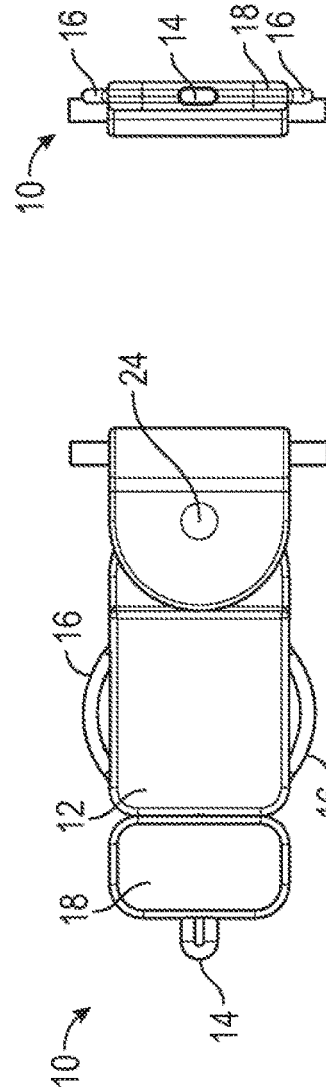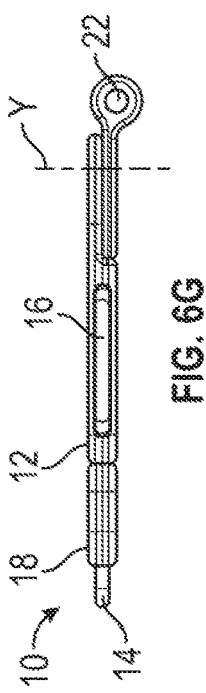

FOLD-FLAT CAR CHARGER INTERFACE

CROSS REFERENCE TO PRIOR APPLICATION

This application claims the benefit of U.S. Provisional Application No. 62/789,568, filed Jan. 8, 2019, which is incorporated herein by reference.

FIELD OF INVENTION

The present invention generally relates to car chargers for electronic devices, and more particularly relates to a car charger interface that can be folded flat or into a compact size and shape when not in use, and conversely unfolded for use to connect an electronic device with a car charger socket for recharging purposes.

BACKGROUND OF THE INVENTION

Present day consumers typically own several electronic devices specifically designed for portability and on-the-go use, including, for example, a mobile phone or smart phone, a portable music player like an iPod® or an MP3 player, a tablet like an iPad®, a portable gaming unit, a digital camera or camcorder, and the like. Each of these devices requires frequent recharging. Portable power chargers are also common for on-the-go recharging of other devices.

Such electronic devices and portable power chargers typically utilize a power cord or cable for connecting the device to a power source, such as a wall outlet, a car charger socket, an airplane charger socket, or a computer. Often, a separate cable is usually required for each power source. Some devices have built in connection interfaces adapted to connect to an external power source for charger. For example, it is common for a device to have a car charger interface built in to the device housing whereby the car charger interface can be pivoted between an extended condition for use and a retracted condition for storage (when not in use). When the car charger interface is extended, it can be inserted into a complementary car charger socket such that the electronic device, or any device connected to an adapter with such a car charger interface, is recharged when the car is turned on. When the car charger interface is retracted for storage, it is optimally contained within the device housing so as to keep the three-dimensional footprint of the device small, efficient and sleek.

An issue with existing car charger interface designs is that they effect how small a device can truly be. Consumers desire portable power chargers that take up as little space as possible without compromising the power available in the charger. However, if a portion of the charger housing is taken up by a storage cavity for a car charger interface of common shape and size, then there is less room for the rechargeable battery contained within the portable charger in order to keep the three-dimensional footprint of the charger device small and compact. It is generally not desirable to store the car charger interface outside the housing because the interface can easily get snagged when placed in a purse or bag or the user's pocket and possibly get damaged. Moreover, the electrical contacts on the interface could be damaged if exposed to or contacted by other items. Accordingly, it remains a desire to pivot and retract the car charger interface for storage within a device housing while not restricting or comprising the size, shape and power of the device.

In view of the foregoing, there is a need for a compact car charger interface that may be connected to and used to charge electronic devices and portable power charger while allowing the size of the device to be reduced without unnecessarily comprising power capacity of said device. Additionally, there is a need for such a car charger interface that can be stored within a device housing when not in use or needed without affecting the overall size and shape of the device housing. For example, there is a need for a storable car charger interface that can be stored within the three-dimensional footprint of a device without inhibiting the size of a rechargeable battery disposed within the device, or compromising the intended operation and function of the interface. Still further, there is a need for a car charger interface that is easily accessible, extendible and easy to use for recharging a device via connection with a car charger socket, including an interface design that has increased flexibility, accessibility and functionality to connect an electronic device or a portable power charger with a power source for recharging purposes. Accordingly, it is a general object of the present invention to provide a compact car charger interface that improves upon conventional car charger interface designs currently on the market and that overcomes the problems and drawbacks associated with such prior art adapters.

SUMMARY OF THE INVENTION

In accordance with the present invention, a compact car charger interface is provided for charging electronic devices and portable power chargers to which the interface is connected. In general, the car charger interface is connected to a device housing and preferably adapted for movement between an extended condition for use (i.e., for connection with a complementary car charger socket) and a retracted condition for storage (i.e., when the interface is not needed or not in use). In use, the car charger interface is adapted for insertion into a car charger socket, and generally includes electrical contacts adapted for electrical communications with corresponding contacts disposed within the charger socket. When not in use, the car charger interface can be moved to the retracted condition where it is preferably stored within a storage cavity formed in the device housing. In the alternative, the interface can be retracted to a position adjacent to, and more preferably flush with, the device housing In a first aspect of the car charger interface in accordance with the present invention, the interface has a generally flat shape when not in use. More preferably, the interface can be folded to a generally flat shape when not in use and for storage, but unfolded for use and connection with a standard car charger socket. As so folded, the interface takes up less space for storage. As a result, the volume of the device housing can be used for other components, such as a rechargeable battery whereby the power of the device can be increased by maximizing the size of the battery based on the desired size, shape and compactness for the device (e.g., a portable power charger) without unnecessarily increasing the size of the device. When the car charger interface is needed for use to connect the device to a car charger socket, the interface can be extended and unfolded so that it will fit into and connect with the charger socket without compromising charger operation or functionality.

In embodiments of the car charger interface in accordance with the present invention, the interface comprises a base portion and a movable portion. The movable portion is pivotally connected to the base portion, and movable relative to the base portion between and unfolded or extended position for use and a folded or retracted position for non-use and storage. In preferred embodiments, the movable portion is flat or flush with the base portion when in its folded condition.

In one design, the movable portion comprises one or two wings pivotally connected to the base portion along the central longitudinal axis of the base portion. As folded or retracted, the wings are generally parallelly disposed adjacent to or flush with the base portion. When unfolded or extended, the wings project generally normally from the base portion to form a generally X-shaped adapter body, which can be inserted into a car charger socket. The electrical contacts are all preferably mounted on the base portion and are in operative communication with a rechargeable battery disposed in the device on which the car charger interface is mounted.

In another design, the movable portion is positioned at the end of the base portion and connected thereto via a pivot point at the central longitudinal axis of the base portion. The movable portion can be pivoted about the pivot point between an unfolded or extended position where it is generally normal to the base portion and forms a generally X-shaped body when viewed from the end, and a folded or retracted position where it is in line, or co-planar, with the base portion so the entire interface is generally flat. In such an alternate design, the negative and ground electrical contacts are mounted on the base portion, while the positive electrical contact is mounted on the movable portion at the tip of the interface. Each of the connections is in operative communication with a rechargeable battery disposed in the device on which the car charger interface is mounted.

In another aspect of the present invention, the car charger interface can be mounted to a device housing with varying degrees of movement and/or rotation to maximize the connectivity of a device with a car charger socket. In this regard, the interface can be pivotally mounted to a device housing, and thereby movable between a retracted condition/position for storage and an extended condition/position for use. In the retracted condition, the interface could be stored within a storage cavity formed within the footprint of the device housing. In the extended condition, the interface could be pivoted about yaw, pitch and/or roll axes.

Similarly, the interface could be movable between an extended condition/position and a retracted condition/position by sliding the interface relative to the device housing. In the retracted condition, the interface could be stored within a storage cavity formed within the three-dimensional footprint of the device housing or positioned against a face of the device housing. In the extended condition, the interface could be slid outward and away from the storage position so that the interface projects out and away from the device housing. Moreover, once extended, the interface could thereafter be pivoted about yaw, pitch and/or roll axes.

These and other objects, features and advantages of the present invention will become apparent in light of the detailed description of embodiments thereof, as illustrated in the accompanying drawings.

BRIEF DESCRIPTION OF THE DRAWINGS

FIGS. 4A and 4B show top perspective views of a first embodiment of a car charger interface in accordance with the present invention is its first flat-folded condition.

FIGS. 4C-4H illustrate planar views of the car charger interface of FIG. 4A.

FIGS. 6A and 6B show top perspective views of a second embodiment of a car charger interface in accordance with the present invention is its first flat-folded condition.

FIGS. 6C-6H illustrate planar views of the car charger interface of FIG. 6A.

DETAILED DESCRIPTION OF THE DRAWINGS

Figure 1A:
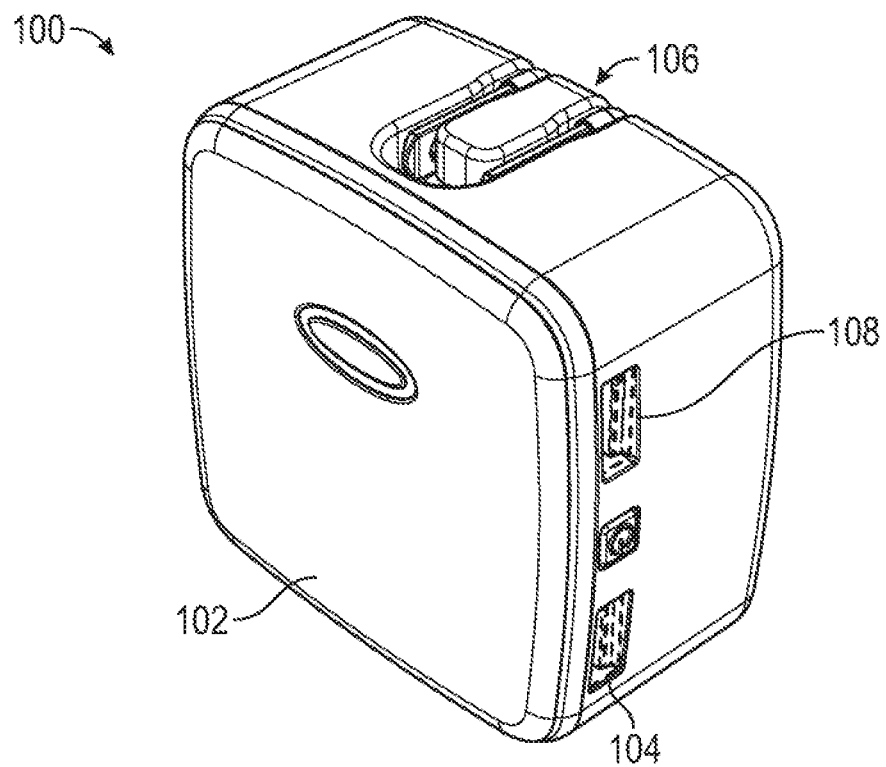
FIGS. 1A and 1B show front and back perspective views, respectively, of a portable power charger having a fold-flat car charger interface in accordance with the present invention. The car charger interface is shown in FIG. 1B in a retracted, non-use position storable within a storage cavity formed in the charger housing.
Figure 1B:
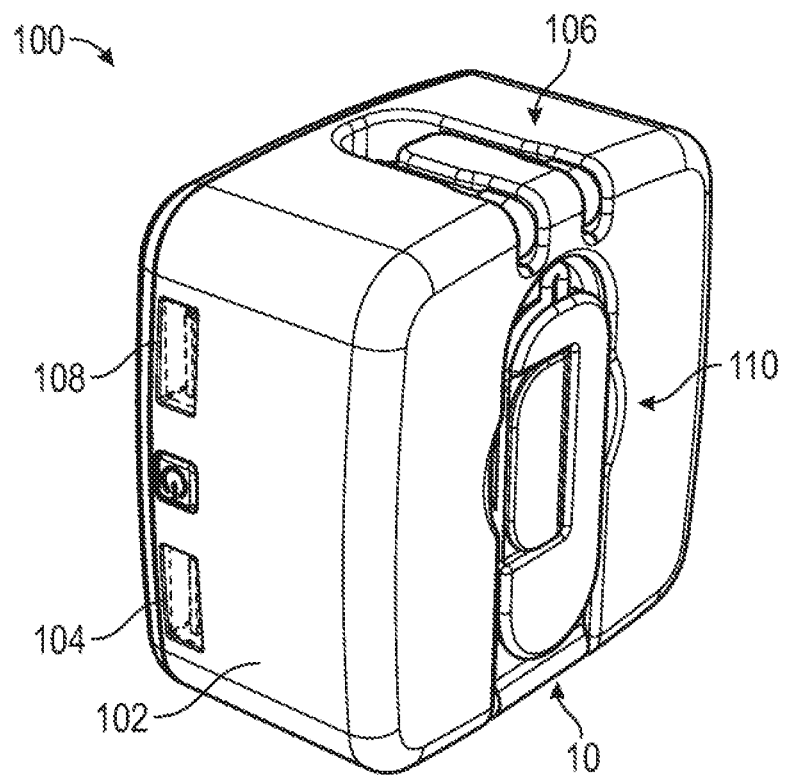

A compact car charger interface in accordance with the present invention is shown in FIGS. 1A-13E in various embodiments and operational set-ups and generally designated by reference numeral 10. In general, the novel car charger interface of the present invention, also commonly referred to as a car charger adapter, is operatively and physically connected to an electronic device or portable power charger and is used to recharge a battery disposed within said device via connection with a standard 12 V DC car charger socket. Referring to FIGS. 1A-1B, an electronic device, illustrated in the form of a portable power charger of the type generally disclosed in co-pending U.S. application Ser. No. 13/833,838, incorporated herein by reference, is shown and generally designated by reference numeral 100.

The portable power charger 100 has a rechargeable battery disposed within a charger housing 102. As illustrated, the car charger interface 10 is physically mounted to the charger housing 102 and operatively in communication with the internal battery of the portable power charger 100. As further illustrated, additional power input interfaces of various design may also be provided (e.g., a plug 104; USB connection ports 106; cables (not shown); etc.), as well as means for outputting power to electronic devices for recharging (e.g., USB connection ports 108; a wireless transmitter (not shown)). In FIG. 1B, a car charger interface 10 in accordance with the present invention is illustrated in a retracted, non-use, storage position. As noted, the car charger interface 10 is in operative communication with the internal rechargeable battery of the portable power charger 100 such that, when the car charger interface 10 is connected with a compatible car charger socket, a power charge can be supplied to the internal rechargeable battery of the portable power charger 100 for recharging the portable power charger 100.

The car charger interface 10 is preferably designed for movement between an extended condition/position for use, where it generally projects out and away from the device housing 102 so that it can be inserted into and connected with a standard car charger socket, and a retracted condition/position for storage, where the interface 10 can be moved into a storage cavity 110 formed in the device housing 102 or positioned adjacent to and optimally flush with the device housing 102. Hereinafter, the terms "condition" and "position" are used interchangeably with regard to the movement of the interface 10 and movable parts thereof.

Figure 2A:
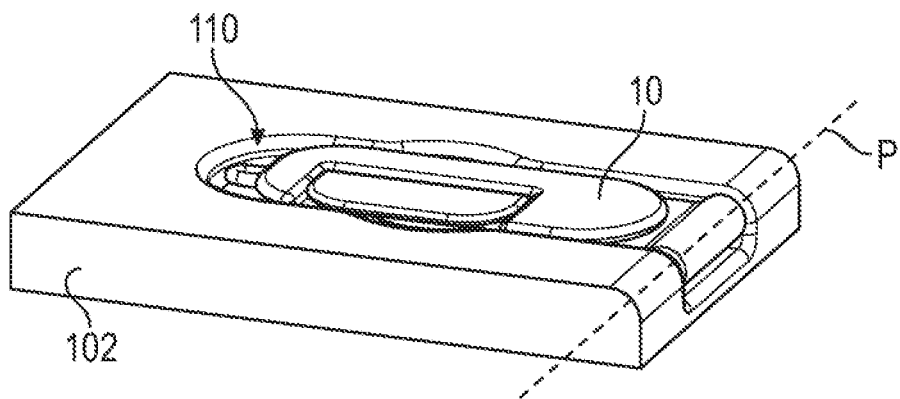
FIG. 2A shows the car charger interface in accordance with the present invention in a retracted, storage position within a device housing having a complementary-shaped storage cavity.
Figure 2B:
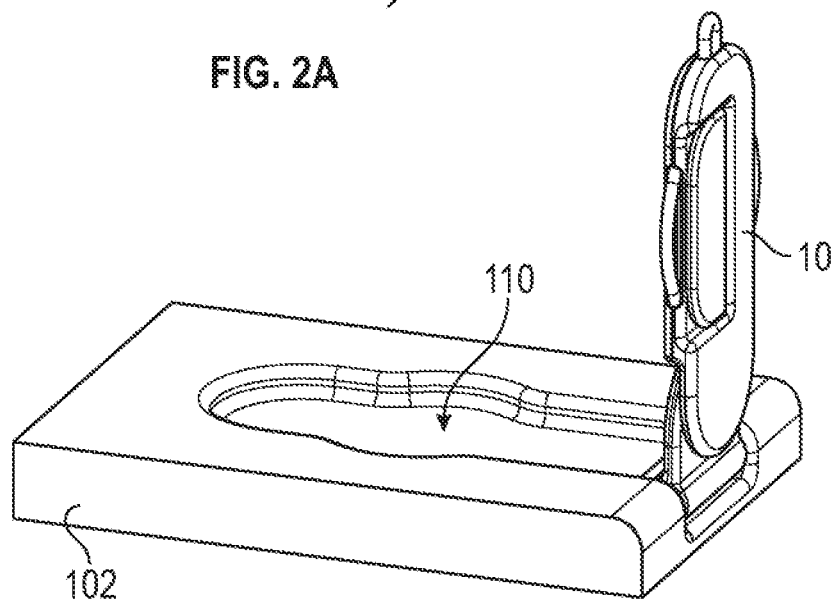
FIG. 2B shows the car charger interface pivoted out from the storage cavity to an extended position.
Figure 2C:
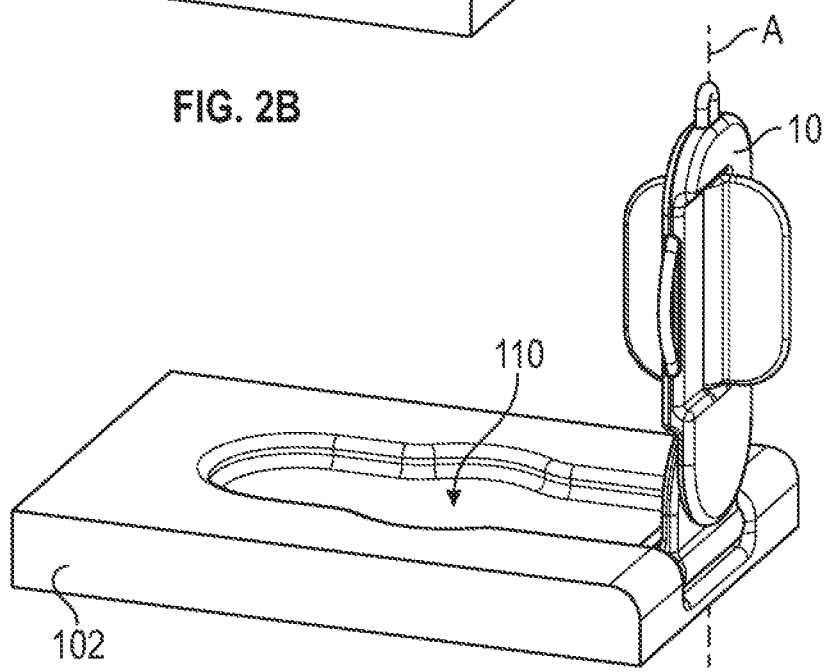
FIG. 2C shows the car charger interface pivoted out from the storage cavity to an extended position and unfolded in accordance with the present invention for use.

Referring to FIGS. 2A-2C, the car charger interface 10 is illustrated with reference to a generic device housing 102. In FIG. 2A, the car charger interface 10 is in its retracted, non-use, storage position. As illustrated, the car charger interface 10 is in its folded, flattened condition and generally sits within the illustrated storage cavity 110 so that the entirety of the interface 10 fits within the three-dimensional footprint of the device housing 102. This effectively keeps the size and shape of the device housing 102 small, compact, sleek and aesthetically desirable.

As illustrated, the storage cavity 110 formed into the charger housing 102 is adapted to receive the car charger interface 10 in its retracted position. Optimally, the storage cavity 110 allows the car charger interface 10 to be stored within the three-dimensional footprint of the charger housing 102 so that the interface 10 does not stick out or project from the housing 102 when not in use. In the illustrated embodiments, the storage cavity 110 has a complementary shape to the car charger interface 10. In this regard, the car charger interface 10 can be protected from damage, and further does not detract from the look and overall aesthetic of the portable power charger 100.

Figure 10:
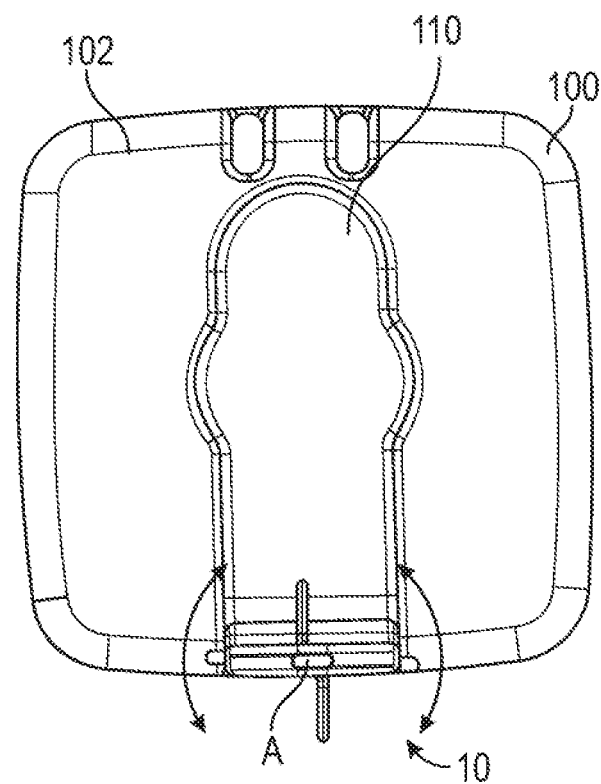
FIG. 10 illustrates an end planar view of the car charger interface of FIG. 5A in accordance with an alternate embodiment of the present invention whereby the car charger interface has roll-pivoting capability.
Figure 12:
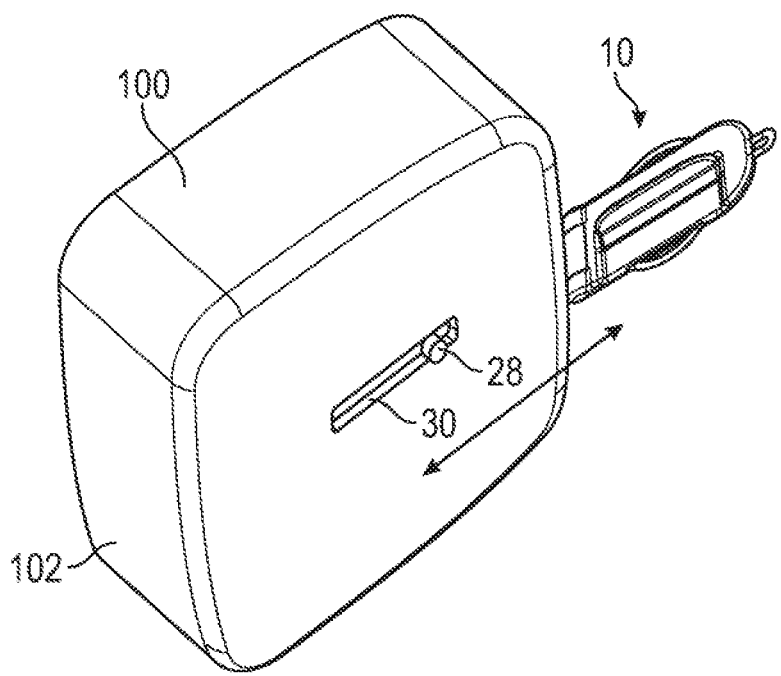
FIG. 12 illustrates another alternate embodiment of a slidable fold-flat car charger interface in accordance with the present invention.
Figure 13A:
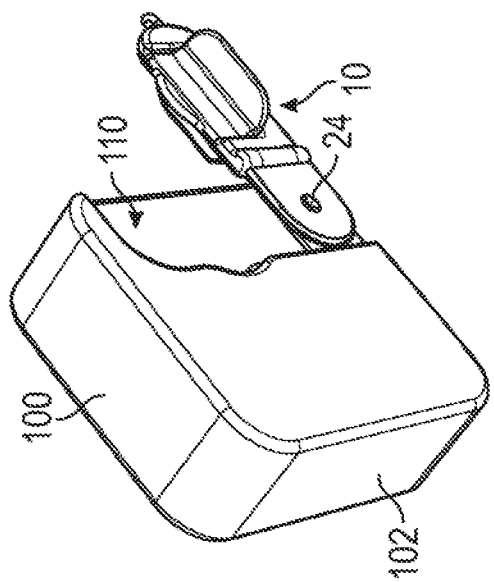
FIGS. 13A-13E illustrate another alternate embodiment of a fold-flat car charger interface in accordance with the present invention whereby the car charger is yaw pivoted from a retracted storage position to an extended position for use after unfolding the car charger interface, and whereby the car charger interface further has pitch pivoting capability.
Figure 13B:
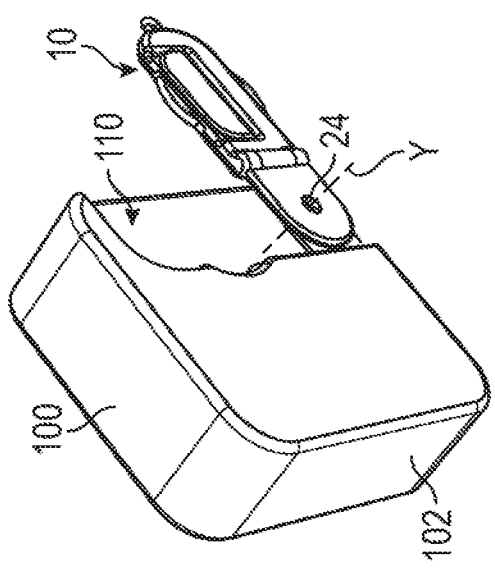
Figure 13C:
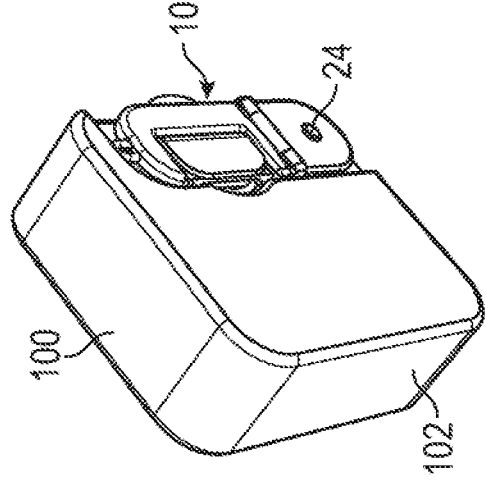
Figure 13D:
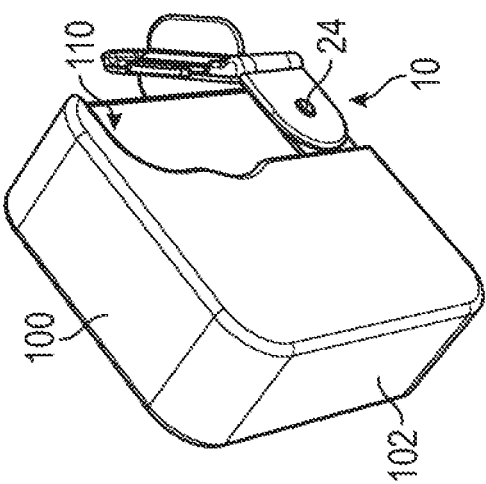
Figure 13E:
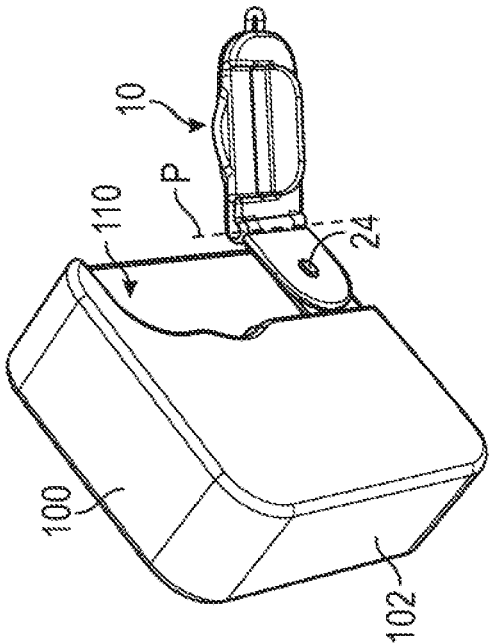

In FIG. 2B, the car charger interface 10 is moved, or pivoted, to an extended position extending out and away from the charger housing 102. As illustrated, the car charger interface 10 pivots from the charger housing 102 along a pivot axis P permitting pitch rotation. Alternate embodiments permitting pitch rotation about axis P are shown in FIGS. 13D-13E. In additional alternate embodiments, a pivot axis Y could permit yaw pivoting of the car charger interface 10, such as illustrated in FIGS. 13A-13C. Further, the car charger interface 10 could be provided with a pivot axis permitting roll rotation, such as shown in FIG. 10. In still further embodiments, the car charger interface 10 could be mounted for sliding movement on or within the charger housing 102, as illustrated in FIGS. 11A-11C and FIG. 12.

As illustrated, the car charger interface 10 is a fold-flat adapter in that the interface 10 can be manipulated between a folded or retracted condition (illustrated in FIGS. 2A and 2B) to reduce its size and shape when not in use and an unfolded or extended condition (as illustrated in FIG. 2C) where is it adapted for insertion into and connection with a car charger socket. In accordance with preferred embodiments of the present invention, the folded or retracted condition of the car charger interface 10 has a generally flattened profile. A first embodiment is illustrated in FIGS. 4A-4H. An alternate embodiment is illustrated in FIGS. 6A-6H. As so designed, the storage volume of the car charger interface 10 is reduced such that less space of the charger housing volume is needed for storage of the car charger interface 10 when not in use. In this regard, the less space taken up by a stored interface 10 allows for greater space to be used by the internal rechargeable battery or other operative components of the electronic device 100, which can increase the power and functionality of the device 100 with which the car charger interface 10 of the present invention is used.

Referring to FIG. 2C, as noted, the car charger interface 10 may be pivoted to an extended position for use and also manipulated to its own unfolded condition such that it can be inserted into and connected with a car charger socket for intended operation in accordance with known usage of car charger interfaces. Referring more particularly to FIGS. 5A-5G, in a first embodiment of a car charger interface 10 in accordance with the present invention, the interface 10 comprises a first base portion 12 that includes the appropriate operative positive and negative/ground contacts 14 and 16, respectively. A second movable portion 18 is pivotally attached to the first base portion 12 for relative movement between the folded and unfolded conditions of the interface 10. Though the second portion 18 is referred to herein as "movable" and the first portion 12 is referred to as the "base", in actuality, the first and second portions 12, and 18 are relatively movable to one another such that the first portion 12 could be the "movable" portion or both portions 12 and 18 could be "movable" without departing from the principles and spirit of the present invention.

Figure 5A:
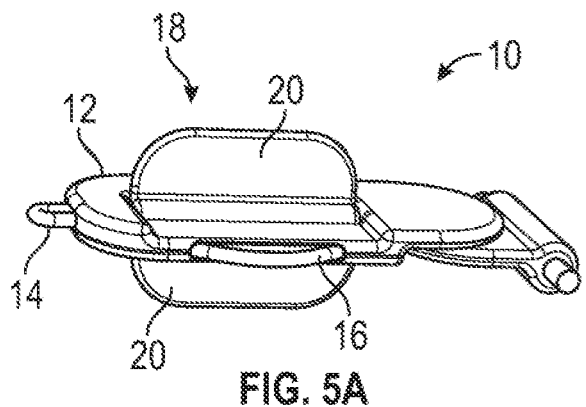
FIGS. 5A and 5B shows top and bottom perspective views, respectively, of the car charger interface of FIG. 4A in its second, unfolded condition ready for use.
Figure 5B:
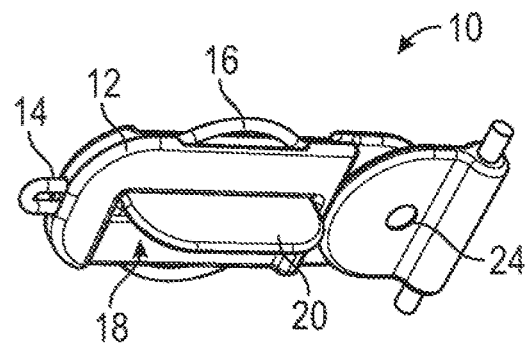
Figure 5C:
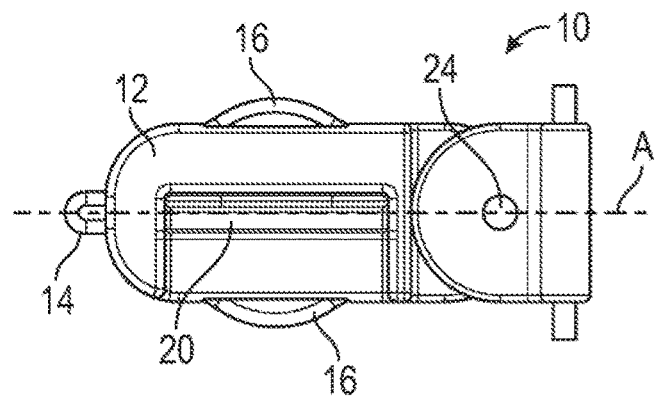
FIGS. 5C-5G illustrate planar views of the car charger interface of FIG. 5A.
Figure 5D:
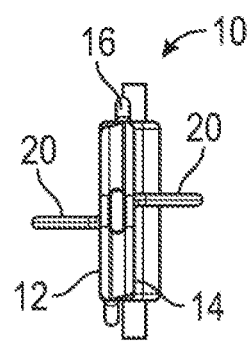
Figure 5E:
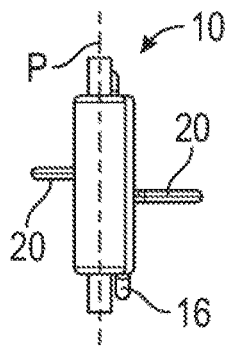
Figure 5F:
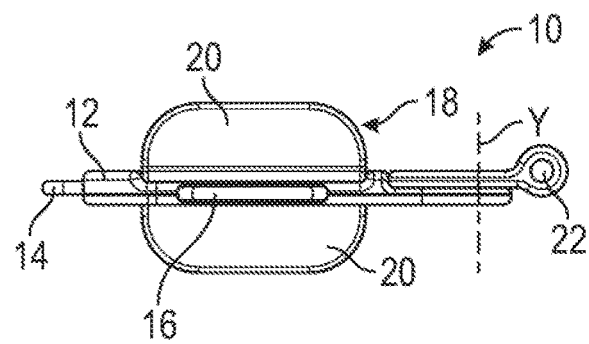
Figure 5G:
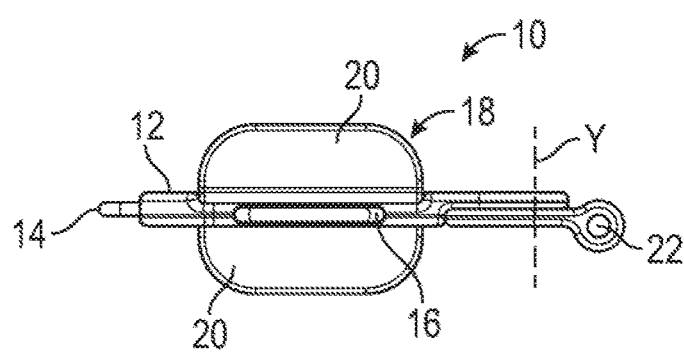

As illustrated in FIG. 5A, the second movable portion 18 comprises two movable wings 20 generally attached along or near the central longitudinal axis A of the first base portion 12 which can be pivoted out from the first base portion 12 to form a generally X-shaped body when viewing the car charger interface 10 from the longitudinal end thereof (as illustrated in FIG. 5D). Ideally, the wing portions 20 will snap into this unfolded position so that they do not accidentally move back to the flattened folded condition, especially during use via connection with a car charger socket, until the user pushes the wings 20 back to such a non-use condition. When the car charger interface 10 is not in use, the movable wings 20 are positioned so that they are preferably generally flush or coplanar with the first base portion 12, and the overall appearance of the car charger interface 10 is flattened, as illustrated, for example, in FIG. 4A.

Figure 7A:
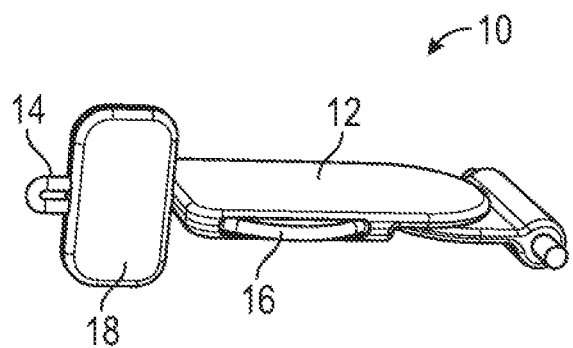
FIGS. 7A and 7B shows top and bottom perspective views, respectively, of the car charger interface of FIG. 6A in its second, unfolded condition ready for use.
Figure 7B:
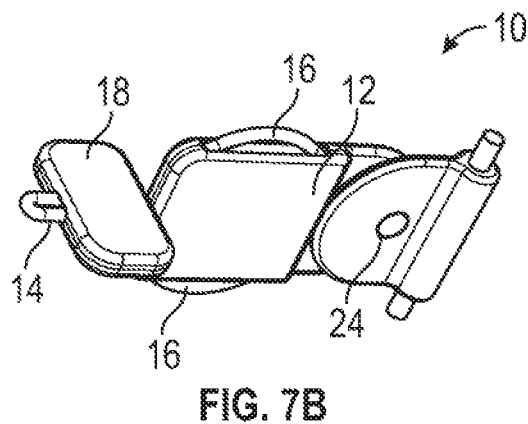
Figure 7C:
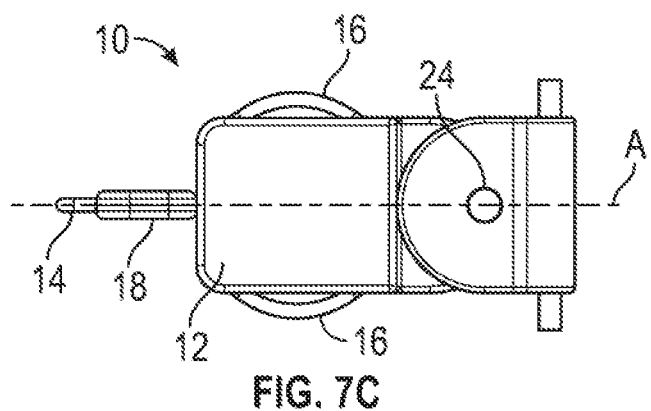
FIGS. 7C-7G illustrate planar views of the car charger interface of FIG. 7A.
Figure 7D:
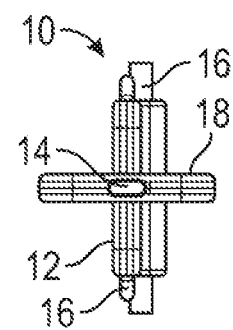
Figure 7E:
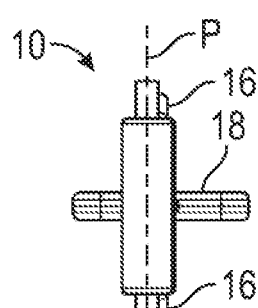
Figure 7F:
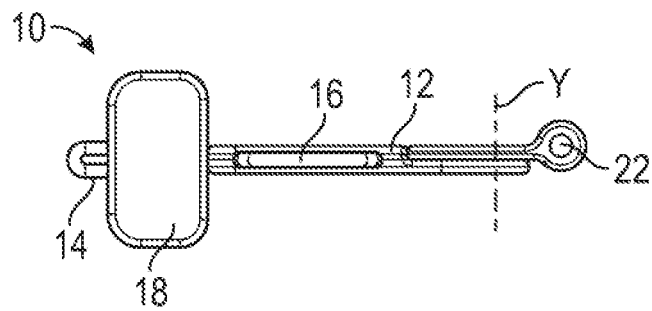
Figure 7G:
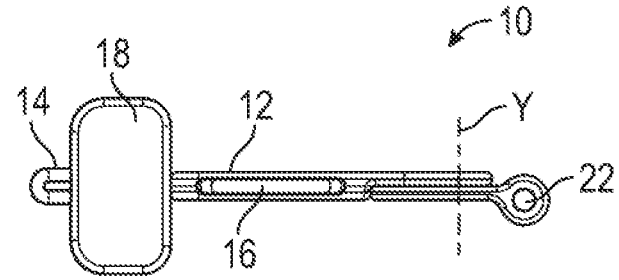

Referring to FIGS. 7A-7G, an alternate design of the car charger interface 10 in accordance with the present invention is illustrated where the second movable portion 18 is pivotally mounted on the longitudinal end of the first base portion 12 and pivotable about a pivot axis extending along the central longitudinal axis A of the first base portion 12. The negative and ground contacts 16 are located on the first base portion 12, while the positive contact 14 is located on the second movable portion 18. For use, the second movable portion 18 can be pivoted to a position where the car charger interface 10 forms a generally X-shaped body when viewed from the longitudinal end thereof (as illustrated in FIG. 7D). When the car charger interface 10 is not in use, the second movable portion 18 is positioned so that it is generally flush or coplanar with the first base portion 12, and the overall appearance of the car charger interface 10 is flattened, as illustrated, for example, in FIG. 6A.

Figure 3C:
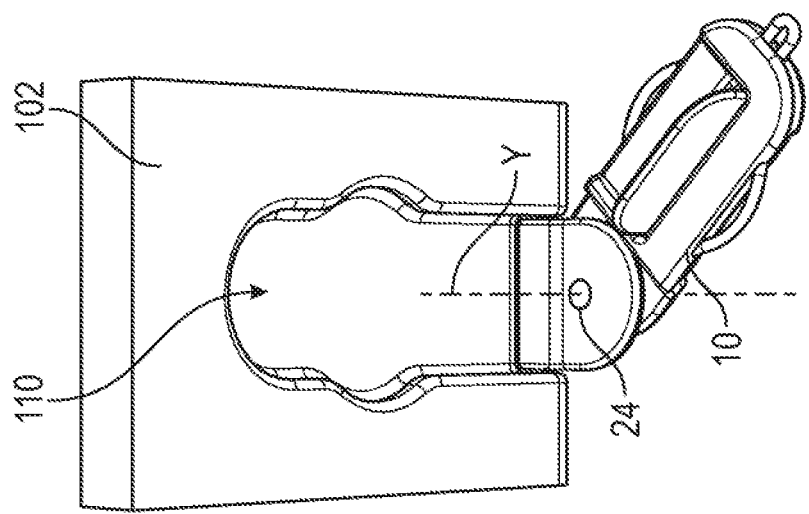
FIGS. 3A-3C show the car charger interface in accordance with the present invention extended to the position of FIG. 2C as further movable to various yaw pivoting positions relative to a pivot point.
Figure 3B:
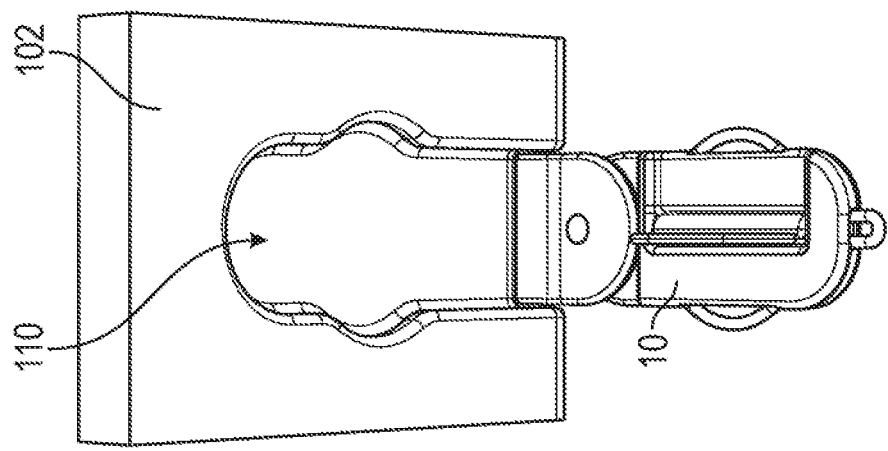
Figure 3A:
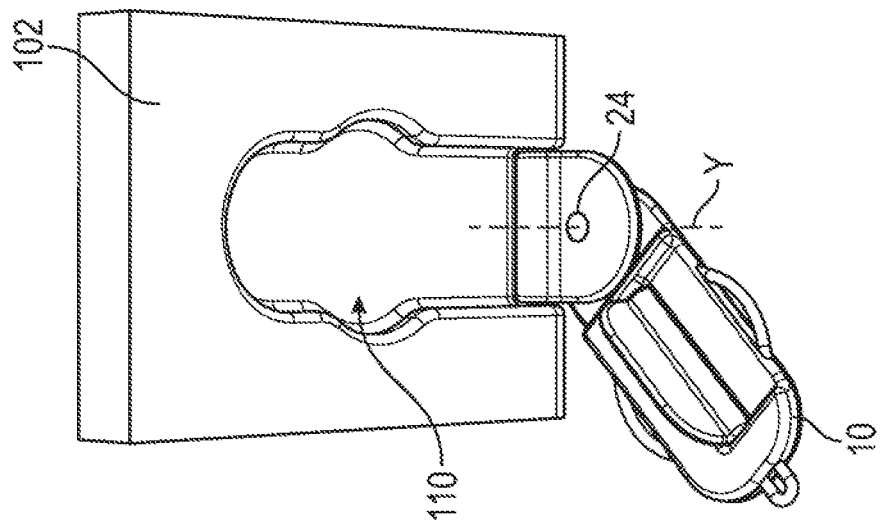

In FIG. 2A, the car charger interface 10 is in its retracted, non-use, storage position. In FIG. 2B, the car charger interface 10 is pivoted out (via pitch rotation) about pitch pivot axis P to an extended position for use. In FIG. 2C, the car charger interface 10 is manipulated to its unfolded and extended condition for insertion into and connection with a car charger socket. Once in this unfolded condition, the car charger interface 10 could be further manipulated relative to the device housing 102, for example, by permitting additional pitch rotation about a pitch pivot point 22 to adjust its angular relationship to the device housing 102; by pivoting the end of the interface 10 about a yaw pivot point 24 permitting yaw rotation, as illustrated in FIGS. 3A-3C; as well as permitting roll rotation about a roll pivot axis and pivot point (not shown), as generally illustrated in FIG. 10.

Figure 8A:
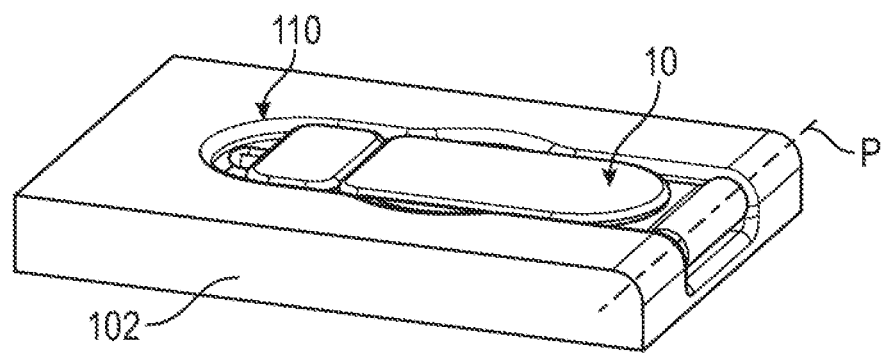
FIG. 8A shows the car charger interface of FIG. 6A in a retracted, storage position within a device housing having a complementary-shaped storage cavity.
Figure 8B:
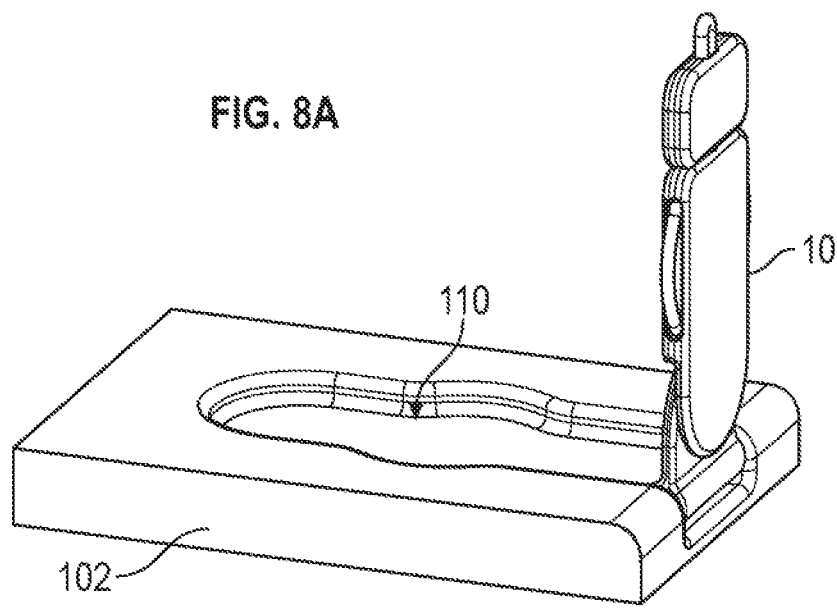
FIG. 8B shows the car charger interface of FIG. 6A pivoted out from the storage cavity to an extended position.
Figure 8C:
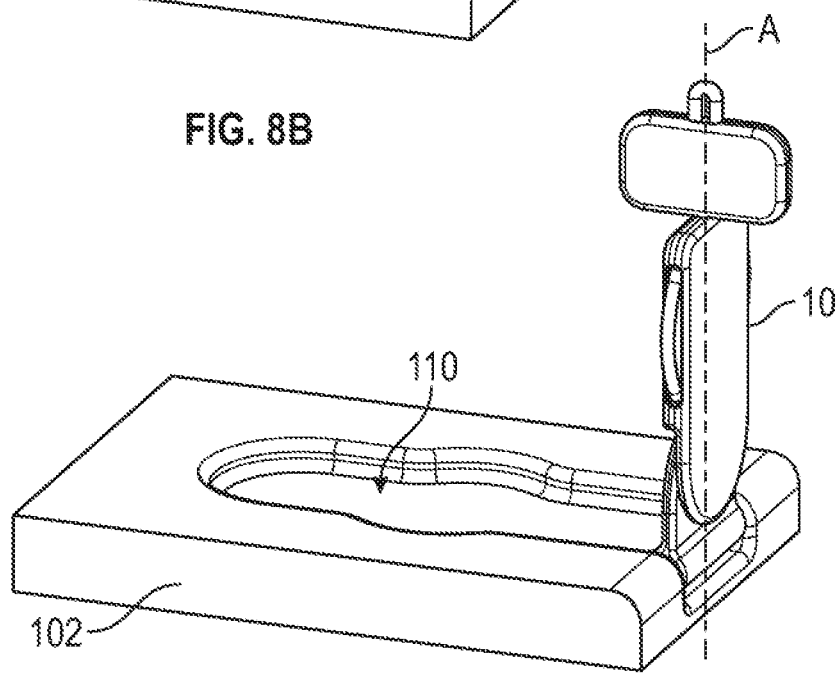
FIG. 8C shows the car charger interface of FIG. 7A pivoted out from the storage cavity to an extended position and unfolded for use.
Figure 9C:
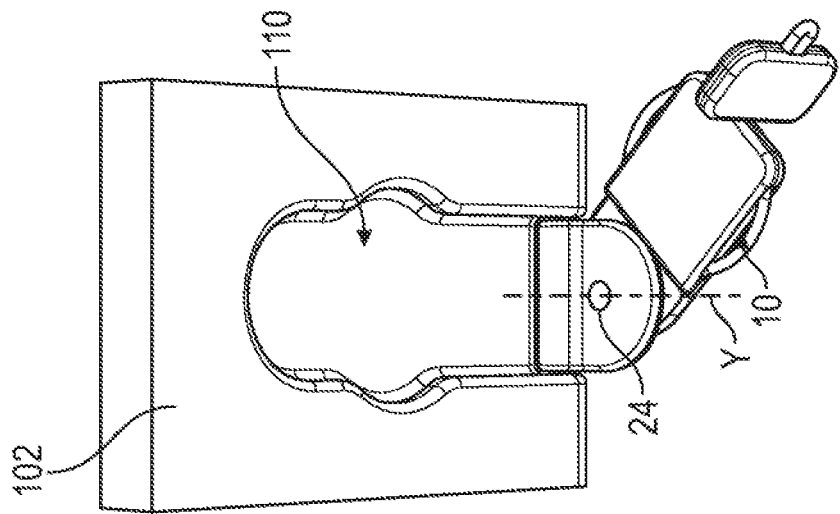
FIGS. 9A-9C show the car charger interface in accordance with the present invention extended to the position of FIG. 8C as further movable to various yaw pivoting positions relative to a pivot point.
Figure 9B:
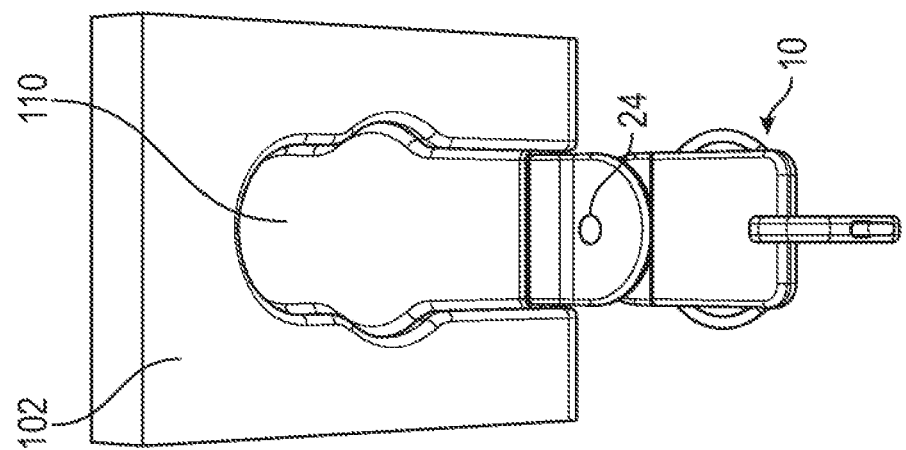
Figure 9A:
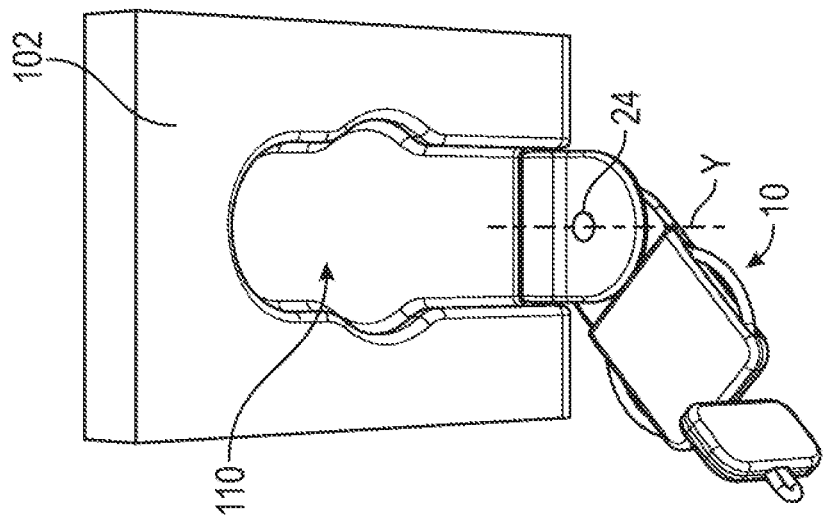

FIGS. 8A-8C illustrate the use of the alternate design of the car charger interface 10 shown in FIGS. 6A-6H relative to a generic device housing 102. Additionally, FIGS. 9A-9C show the yaw rotation capability for this alternate embodiment to again increase the ease and flexibility of using the interface 10 to connect to a car charger socket. This alternate design can further be manipulated with additional pitch rotation to adjust the angular relationship of the interface 10 relative to the device housing 102, as well as roll rotation, such as generally illustrated in FIG. 10.

Figure 11A:
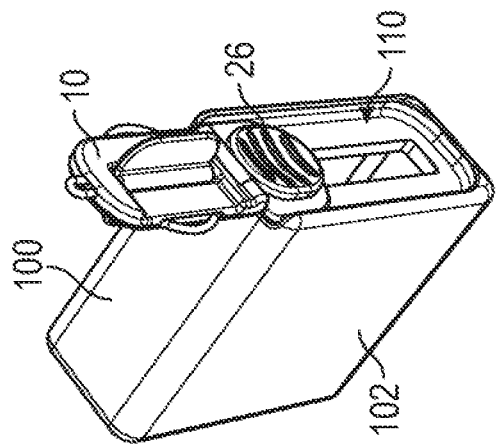
FIGS. 11A-11E illustrate an alternate embodiment of a fold-flat car charger interface in accordance with the present invention whereby the car charger interface can slide between a retracted non-use position and an extended position for use after unfolding the car charger interface, and whereby the car charger interface further has pitch pivoting capability.

An alternate embodiment for connecting the car charger interface 10 to an electronic device or portable power charger 100 is illustrated in FIGS. 11A-11E. As illustrated, the car charger interface 10 is mounted to a device housing 102 for sliding movement between a retracted, non-use, storage position (see FIG. 11A) and an extended position where the car charger interface 10 can be used as intended (see FIGS. 11B-11C). A finger grip 26 is provided on the car charger interface 10 to aid in moving the interface 10 between its retracted and extended positions. As shown in FIG. 11A, the car charger interface 10 is mounted flush on a side face of the device housing 102. In an alternate embodiment, generally illustrated in FIG. 12, the car charger interface 10 could be internally stored within a cavity formed in the device housing 102, and moved between a retracted, storage position (not shown) and an extended position (as shown) by sliding a finger button 28 positioned within a slide channel 30 formed in the device housing 102. In accordance with the present invention, the interface 10 can be folded flat for storage so as to reduce the space needed for the storage cavity, thereby allowing the power capability of the charger 100 to be increased relative to the size and shape of the charger housing 102.

Figure 11B:
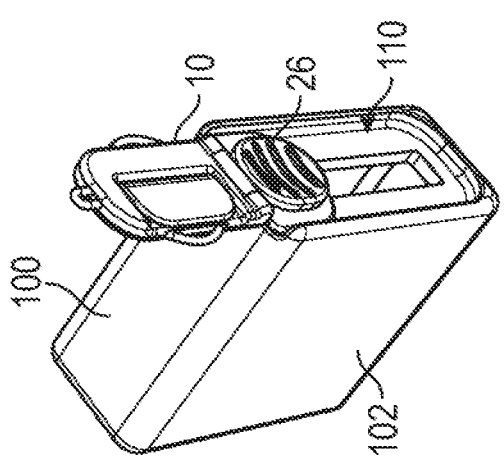
Figure 11C:
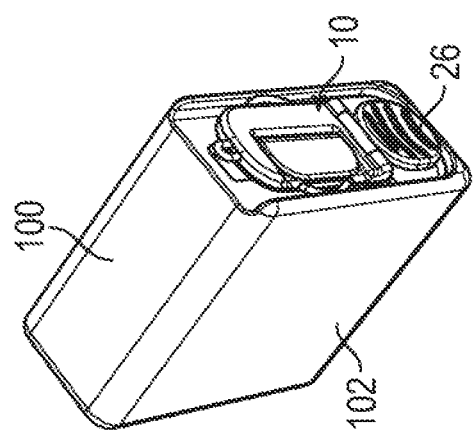
Figure 11D:
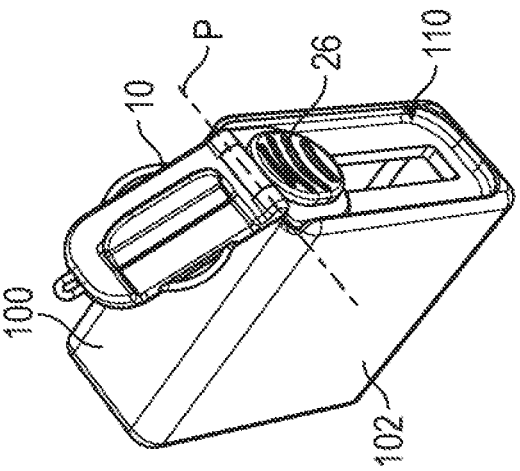
Figure 11E:
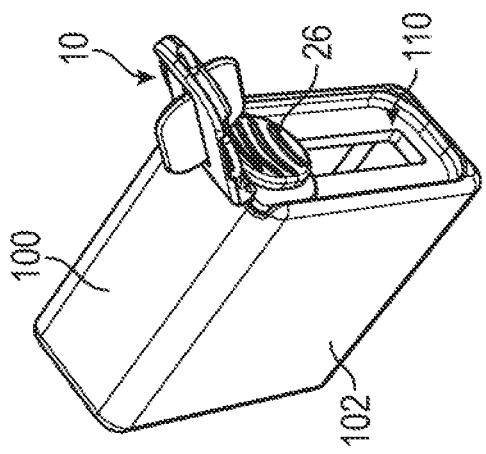

Referring to FIG. 11B, the sliding car charger interface 10 is shown in its extended position but still in a folded (flattened) condition. As with other embodiments described herein, the car charger interface 10 can be manipulated to its unfolded condition, as illustrated in FIG. 11C, with the second movable portion 18 projecting normally from the first base portion 12 to form a generally X-shaped body. Once in this condition, the car charger interface 10 can be inserted into and connected with a car charger socket for use. Additionally, as illustrated in FIGS. 11D and 11E, a pitch pivot axis P can be provided so that the position of the car charger interface 10 relative to the device housing 102 can be further manipulated. Additional pivot axes can be included to provided for yaw and roll pivoting capability without departing from the principles and spirit of the present invention.

Another alternate embodiment for connecting the car charger interface 10 to an electronic device or portable power charger 100 is illustrated in FIGS. 13A-13E. As illustrated, the car charger interface 10 is mounted to a device housing 102 for pivoting movement (much like a pocket knife) about yaw pivot point 24 between a retracted, non-use, storage position (see FIG. 13A) and an extended position where the car charger interface 10 can be used as intended (see FIGS. 13B-13C). As shown in FIG. 13A, the car charger interface 10 is mounted flush on a side face of the device housing 102 in a generally flattened condition to reduce the size of the storage cavity 1190 needed so as to keep the size and shape of the device 100 small and compact. As so stored, the interface 10 is generally maintained within the three-dimensional footprint of the device housing 102. In an alternate embodiment, the car charger interface 10 could be internally stored within a cavity formed in the device housing 102.

Referring to FIG. 13B, the pivoting car charger interface 10 is shown in its extended position but still in a folded (flattened) condition. As with other embodiments described herein, the car charger interface 10 can be manipulated to its extended condition, as illustrated in FIG. 13C, with the second movable portion 18 projecting normally from the first base portion 12 to form a generally X-shaped body. Once in this condition, the car charger interface 10 can be inserted into and connected with a car charger socket for use. Additionally, as illustrated in FIGS. 13D and 13E, a pitch pivot axis P can be provided so that the position of the car charger interface 10 relative to the device housing 102 can be further manipulated. An additional roll pivot axis can be included without departing from the principles and spirit of the present invention.

Though the embodiments of FIGS. 11A-11E, 12 and 13A-13E are shown using the first embodiment of the fold-flat car charger interface 10 of FIGS. 4A-4H in accordance with the present invention, the alternate interface design illustrated in FIGS. 6A-6H can also be used for such designs without departing from the principles or spirit of the present invention.

The foregoing description of embodiments of the present invention has been presented for the purpose of illustration and description. It is not intended to be exhaustive or to limit the invention to the form disclosed. Obvious modifications and variations are possible in light of the above disclosure. The embodiments described were chosen to best illustrate the principles of the invention and practical applications thereof to enable one of ordinary skill in the art to utilize the invention in various embodiments and with various modifications as suited to the particular use contemplated.

What is claimed is:

1. A car charger interface adapted to be inserted within a car charger socket for electrical connection therewith, said car charger interface comprising:
    a first portion; and
    a second portion;
    wherein the second portion is movable relative to the first portion between a folded condition and an unfolded condition and defines at least one wing pivotally connected to the first portion along a central longitudinal axis of the first portion, said at least one wing being pivotable between the folded condition where said at least one wing is disposed adjacent to the first portion and the unfolded condition where said at least one wing projects away from the first portion;
    wherein the car charger interface assumes a shape adapted for complementary connection with the car charger socket when the second portion is in the unfolded condition.

2. The car charger interface according to claim 1, wherein the car charger interface is flat when the second portion is in the folded condition.

3. The car charger interface according to claim 1, wherein the car charger interface defines an X-shaped body when the second portion is in the unfolded condition.

4. The car charger interface according to claim 1, wherein the second portion is mounted at the longitudinal end of the first portion and connected thereto via a pivot point aligned with a central longitudinal axis of the first portion for movement between the folded and unfolded conditions.

5. The car charger interface according to claim 1, further comprising a positive electrical contact and a negative electrical contact.

6. The car charger interface according to claim 5, wherein the positive electrical contact and the negative electrical contact are both disposed on the first portion of the car charger interface.

7. The car charger interface according to claim 5, wherein the positive electrical contact is disposed on the first portion and the negative electrical contact is disposed on the second portion.

8. The car charger interface according to claim 1, wherein the car charger interface is physically and electrically connected to an electronic device.

9. The car charger interface according to claim 8, wherein the electronic device comprises a device housing defining a cavity for storage of the car charger interface therein, wherein when the car charger interface is disposed within the three-dimensional footprint of the device housing when the car charger interface is stored within the cavity.

10. The car charger interface according to claim 9, wherein the car charger interface is movable between an extended condition where the interface extends away from the device housing, and a retracted condition where the interface is storable within the storage cavity formed in the device housing.

11. The car charger interface according to claim 10, wherein the car charger interface is movable relative to the device for motion about at least one of a pitch axis, a yaw axis and a roll axis.

12. The car charger interface according to claim 9, wherein the car charger interface is slidable between the retracted condition and the extended condition.

13. The car charger interface according to claim 12, wherein the car charger interface is movable relative to the device for motion about at least one of a pitch axis, a yaw axis and a roll axis.

* * * * *